United States Patent [19]
Reilly

[11] 3,745,941
[45] July 17, 1973

[54] SLAGGING REFUSE INCINERATORS

[76] Inventor: Bertram B. Reilly, 17 Briar Cliff Road, Ben Avon Heights, Pa. 15202

[22] Filed: Dec. 3, 1971

[21] Appl. No.: 204,629

[52] U.S. Cl. .................................. 110/8 R, 110/15
[51] Int. Cl. ............................................. F23g 5/00
[58] Field of Search .................... 110/7 R, 8 R, 8 C, 110/18 R, 18 C, 15

[56] References Cited
UNITED STATES PATENTS

| | | | |
|---|---|---|---|
| 3,344,758 | 10/1967 | Wotschke | 110/18 |
| 3,417,717 | 12/1968 | Jacobovici | 110/18 X |
| 2,269,273 | 1/1942 | Krogh et al. | 110/8 |
| 3,504,645 | 4/1970 | Davenport | 110/8 |

*Primary Examiner*—Kenneth W. Sprague
*Attorney*—Wm. Henry Venable

[57] ABSTRACT

My invention relates to a method and apparatus for incinerating refuse including the steps of fusing the ash and metallic content of the refuse and quenching the fused material in water to reduce the solid waste discharge to a granular slag for disposal. The apparatus comprises a primary incinerating furnace operated at conventioal incinerating temperature and a slagging furnace in series. The slagging furnace operates at a higher temperature to complete combustion of residual combustible material and to fuse the solid residue. In this apparatus the flues are arranged to provide parallel flow of portions of the flue gas from the primary furnace, one portion passing overhead at relatively low temperature and the other portion passing through the slagging furnace to supply the oxygen to generate the heat for fusing the solid residue.

5 Claims, 4 Drawing Figures

PATENTED JUL 17 1973 3,745,941

SLAGGING REFUSE INCINERATORS

CROSS REFERENCE TO A RELATED PATENT APPLICATION

This disclosure embodies an improvement in the means for feeding material to an incinerator disclosed and claimed in my co-pending patent application Ser. No. 82,908 filed on Oct. 22, 1970. That improvement is, however, optional in the practice of this invention and is not covered by the accompanying claims.

SUMMARY OF THE INVENTION

The object of my invention is to provide an economical method and apparatus for incinerating refuse, such that substantially all combustible content of the refuse is consumed and the solid residue is reduced to a granular slag, with the minimum consumption of air for combustion and fuel. It is recognized that addition of a residue slagging step to incineration of refuse is desirable but this heretofore involved an increase in supplementary fuel consumption or expensive heat recovery apparatus to preheat combustion air which my invention does not require. My improved method and apparatus provide means for using a portion of the flue gas from incineration, which conventionally contains a substantial amount of excess air, as the preheated oxygen supply for the slagging step at solids fusing temperature. The lower temperature portions of my apparatus are shielded against radiation from the higher temperature slagging furnace. The flow of refuse through the system, except at the loading station where a conventional mechanical feeder is provided, and the discharge of quenched slag by a conventional flight conveyor, is by gravity. The flow of the portion of flue gas passing through the slagging furnace is induced by the configuration of the flues and controlled by a damper is a passage for lower temperature flue gas.

BRIEF DESCRIPTION OF THE DRAWINGS

My invention is illustrated in the annexed drawings, in which.

DETAILED DESCRIPTION

Figure 1:
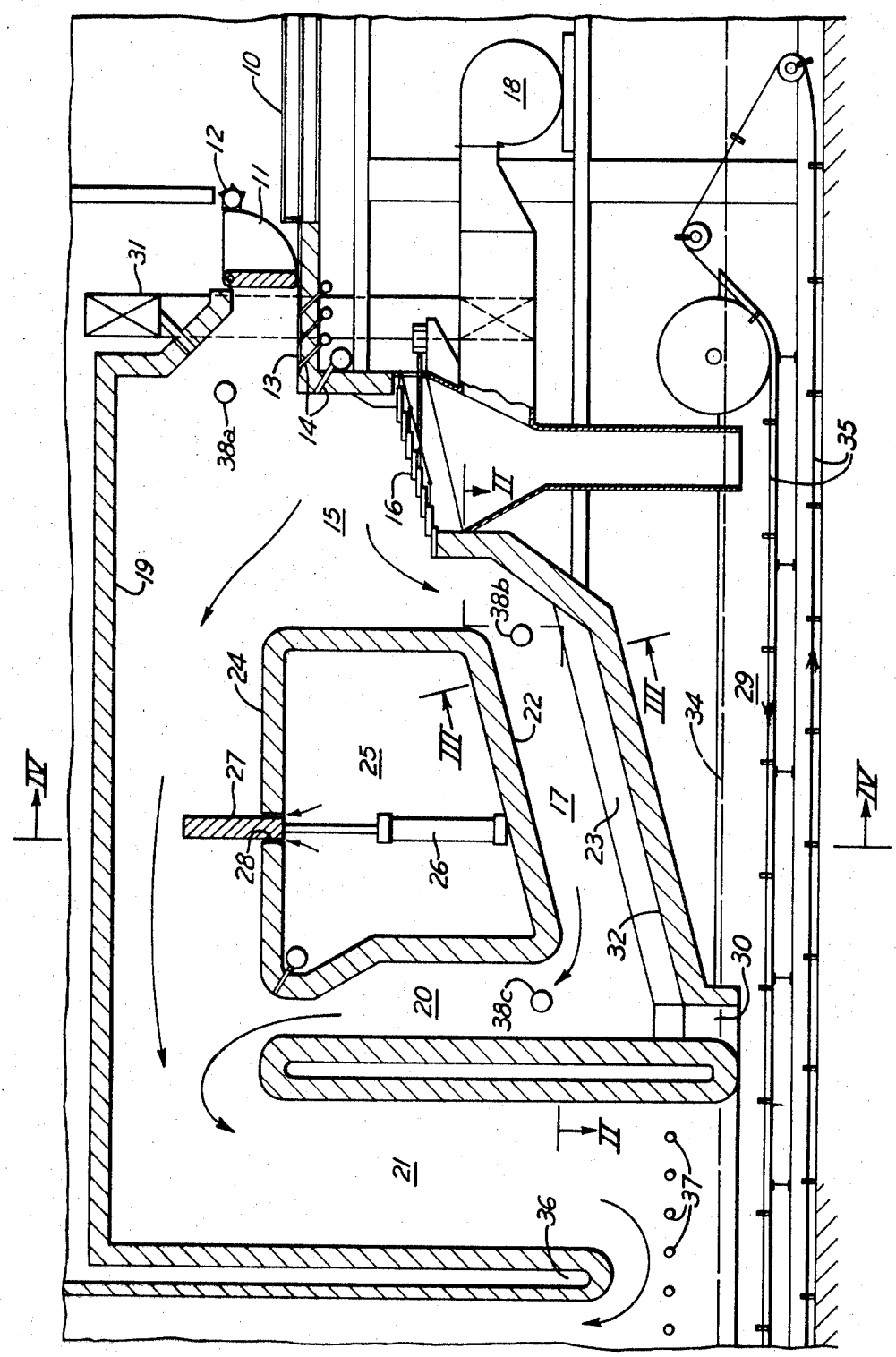
FIG. 1 is a longitudinal vertical cross section through a preferred embodiment of my improved furnace structure.
Figure 2:
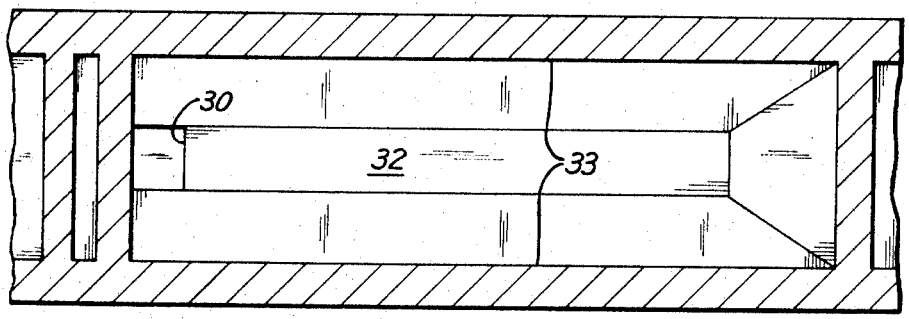
FIG. 2 is a horizontal cross section along the plane II—II of FIG. 1, showing the floor of the slagging furnace.
Figure 3:
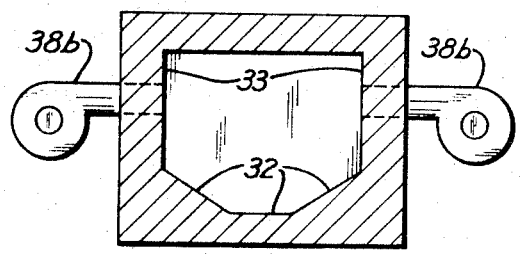
FIG. 3 is a transverse vertical section at the feed end of the slagging furnace at the plane III—III of FIG. 1.
Figure 4:
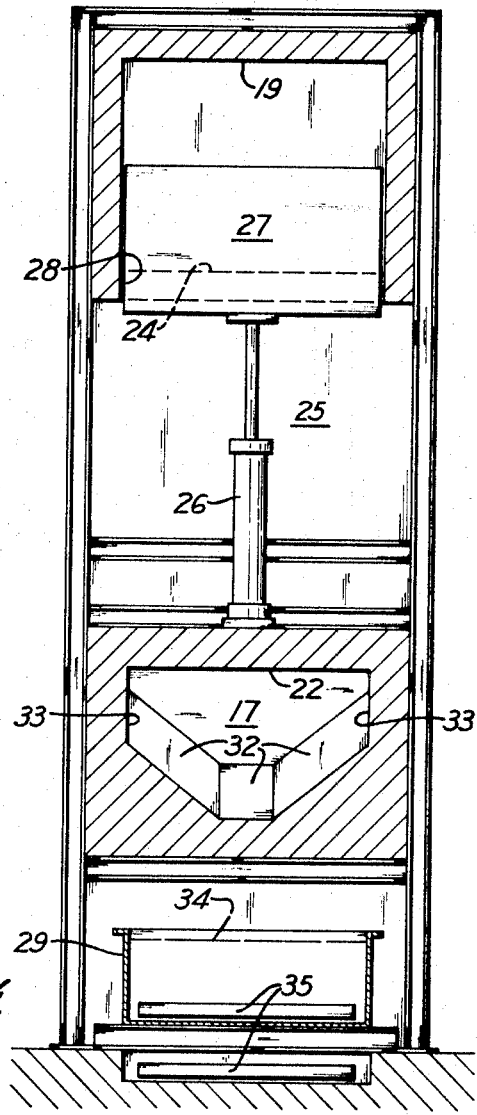
FIG. 4 is a transverse vertical section through the incinerator at the plane IV-IV of FIG. 1.

In the particular embodiment illustrated by the drawing figures, refuse to be incinerated is introduced into the incinerator by a feeder 10 through a furnace gate 11 substantially as disclosed in my U.S. Pat. No. 3,303,947 issued Feb. 14, 1967, preferably including a toothed cut-off roller 12 adjacent the top of the gate on the inlet side as described in detail in my co-pending patent application Ser. No. 82,908 filed on Oct. 22, 1970. When the gate 11 is open, the feeder pushes the refuse from the refuse bin to the hearth 13 of the charging passage inside the furnace, the flow of the refuse being eased by jets of air through nozzles 14, as explained in my U.S. Pat. No. 3,303,947 referred to above. Any other desired means for feeding the incinerator may, of course, be used and this invention is not limited to the particular structure described above.

Combustion of the refuse begins on the hearth 13, and most of the refuse is reduced to flue gases and ash in the primary furnace section 15 above a conventional mechanical grate 16 on which the refuse from hearth 13 falls. The ash and a residual portion of partially, but not completely burned refuse descends from the lower end of the grate 16 into an inclined slagging furnace section 17. Experience with existing incinerator furnaces having a hearth such as 13 and grate such as 16 establishes that most of the burning of the refuse occurs on the hearth and the portion of the grate within about eight feet of the hearth. In the practice of this invention, combustion of the refuse being completed in the slagging furnace section 17, the grate need not extend substantially beyond such lengths.

Sufficient excess air is supplied to the primary furnace 15 to limit its temperature to around 1800°F, which is low enough to avoid fusing of the ash in typical incinerator furnace operation. This air is introduced by the nozzles 14 at the hearth through the grate 16 and through nozzles to the furnace connected to overfire air duct 31 supplied by forced air fan 18. The flue gases from the primary furnace 15 divide into two streams, the larger of which passes overhead below the ceiling 19 of the incinerator and the remainder flows downward through the slagging furnace section 17 co-current with the solid material being consumed and reduced to slag, as indicated by arrows in FIG. 1. The flue gases from the slagging furnace section 17 ascend a substantially vertical flue 20 from the lower end of the slagging furnace section to combine with the gases from primary furnace 15 and this mixture preferably flows downward through a secondary furnace 21 which serves to convert any residual carbon monoxide to carbon dioxide, eliminating such pollution from the gases ultimately discharged to the atmosphere; but such secondary furnace is not necessary for the practice of this invention.

The flow of flue gases beyond the secondary furnace is not illustrated in the drawing, this not being an essential part of this invention, and may be in accord with conventional practice. Typically the sides of the secondary furnace 21 dip into the quench tank 29, explained subsequently, and some of the water spray nozzles 33, also explained subsequently, are shown in FIG. 1. Also typically, the flue gases are withdrawn from the incinerator to the atmosphere under the suction of an induced draft fan. In the course of passing to this fan the gases are drawn through conventional dust removing apparatus such as electrical precipitators, cyclones, or the like.

The inlined slagging furnace section 17 has a refractory roof 22 and a bottom trough 23, between which the refuse being consumed and reduced to slag and the combustion gases are closely confined. Sufficient residual oxygen is contained in the portion of flue gases which flows co-current with the solid material to generate enough heat to operate the slagging furnace section at a temperature high enough to melt the ash and any metallic residues in the refuse. This temperature in the slagging furnace section may be around 3000°F. The roof 22, heated to such temperature, radiates back into the furnace section 17 and shields the upper roof 19 and flue below it from incinerator furnace radiation, facilitating the maintenance of the lower temperature in that upper flue.

This upper flue has a floor 24 substantially parallel to the roof 19, the floor and ceiling forming the top and bottom of the upper flue. Between the floor 24 and roof 22 of the incinerator there is thus provided a space 25 in which, in the preferred practice of my invention, is located a hydraulic cylinder 26 supporting a damper 27 which extends through a slot 28 in the floor 24, and serves to throttle the flow of flue gases through the upper flue. The incinerator being on the suction side of the exhaust fan, as explained previously, any air leakage between the damper 27 and sides of the slot 28 is into the flue, not from the flue into the space 25, as indicated by the arrows in FIG. 1.

The cylinder 26 thus functions as a means for adjusting the amount of throttling of the upper flue passage by raising or by lowering the damper 27 to an optimum level, thereby regulating the ratio of amount of flue gas from the primary furnace which flows co-currently with the solid material through the slagging furnace 17 to the amount of flue gas which by-passes the slagging furnace and passes directly to the secondary furnace 21 through the upper flue. In the preferred method of practicing my invention, damper 27 is thus maintained at a position regulating that ratio so as to supply 1800°F oxygen-containing flue gas to the slagging furnace in an amount sufficient to approximate stoichimetric ratio to the unburned refuse and establish substantially perfect combustion within the slagging furnace 17. This may conveniently be accomplished by a simple temperature control instrumentation, as well known to the art, namely detecting variations in temperature of the slagging furnace 17 above or below the desired operating temperature (e.g. 3000°F), and raising or lowering the damper in such amount as to substantially maintain that operating temperature. If that temperature drops, too much cool flue gas is being admitted to the slagging furnace and the damper is accordingly lowered to by-pass more of this gas through the upper flue. If that temperature rises above the set amount, the damper is raised to increase the flow of cooler flue gas through the slagging furnace sufficiently to restore the desired operating temperature.

The operation of the primary furnace 15 is similarly controlled by automatic temperature control regulating the amount of air admitted through an overfire air duct 31, in accordance with conventional practice for incinerators. Supposing the desired operating temperature for the primary furnace 15 is 1800°F, for example, the temperature controller would be preset to open wider a damper in duct 31 to admit more air if the temperature rises above 1800°F but to throttle the damper if the temperature drops below 1800°F.

The inclined bottom trough of the slagging furnace 17 has a generally hoppered, inclined floor 32 and generally vertical side walls 33, forming a relatively shallow chute. This chute terminates at a vertical outlet passage 30. This passage 30 extends below the water line 34 of a quench tank 29, in which the discharged melted slag is solidified and from which it may be removed by a conventional flight conveyor 35, of which only the tail end is illustrated in FIG. 1.

As mentioned previously, the side of the secondary furnace 21 dip below the water line 34 of the quench tank and the combined flue gas stream is thus required to make a 180° U-turn under an air-cooled arch 36.

Water spray nozzles 37 are installed in the side walls of the chamber at this U-turn, near the water line, providing an atomized water spray to wash out the larger heavy dust particles from the gas stream and reduce the load on the dust removal equipment for final cleaning of the gases discharged to the atmosphere. This construction is similar to the ash removal system disclosed in my U.S. Pat. No. 2,983,234.

For start-up purposes and also to carry the extra heating load of evaporating water from refuse of high moisture content, supplementary burners 38a, 38b, and 38c may be provided. 38a is primarily an ignition burner for initiating combustion on the hearth 13. Burners 38b and 38c at the ends of the slagging furnace section function to accellerate temperature build-up in the furnace section 17 and to assure flue gas flow in the desired pattern during initial starting of the process.

The foregoing disclosure illustrates and describes a preferred embodiment of the device, but my invention is not limited thereto but is more broadly set forth in the following claims.

I claim:

1. A method of incinerating refuse and reducing the consumed solids to granular slag comprising the steps of burning the refuse in a primary furnace to consume the greater part of said refuse, supplying sufficient excess air to said primary furnace to maintain the flue gas therefrom at substantially conventional temperature for incinerator operation, flowing the partially consumed refuse downwardly from said primary furnace into and through a downwardly inclined slagging furnace, diverting a portion of the flue gas from said primary furnace into the upper end of said slagging furnace in quantity containing sufficient oxygen to substantially complete combustion of said refuse and maintain said slagging furnace at a solids-melting temperature, passing the undiverted portion of said flue gas overhead above said slagging furnace through a flue shielded from radiation from said slagging furnace, passing the diverted portion of said flue gas after passing through said slagging furnace upwardly through a substantially vertical flue to recombine with the undiverted portion after its passage above said slagging furnace.

2. The method of claim 1 further characterized by controlling the ratio of diverted to undiverted flue gas flow by throttling said overhead shielded flue in the undiverted flue gas stream.

3. The method of claim 1 further characterized by discharging said melted slag into a water quench and solids granulating trough and sealing the passage for solids into said trough against the passage of flue gas by maintaining a water level in said trough above the bottom of said substantially vertical flue.

4. Apparatus for incinerating refuse and reducing the residue to slag comprising a primary incinerating furnace section and a slagging furnace section in series, the said primary incinerating furnace section being at a higher elevation than said slagging furnace section, the said slagging furnace section being downwardly inclined to provide gravity flow of slag therethrough, an overhead flue from said primary incinerating furnace section above said slagging furnace section, a substantially vertical flue between the discharge end of said slagging furnace section and said overhead flue at its downstream end, an adjustable damper in said overhead flue for regulating the ratio of gas passing therethrough to gas diverted to flow through said slagging furnace section, and a refractory roof for said slagging furnace section shielding said overhead flue from radiation from said slagging furnace section.

5. Apparatus of claim 4 further characterized by having a water trough below said slagging furnace section, an outlet into said water trough at the lower end of said slagging furnace section, said outlet extending below the water level of said trough to seal said outlet against gas flow and direct the exit of all flue gas from the slagging furnace section upwards through said substantially vertical flue.

* * * * *